United States Patent [19]

Okita et al.

[11] 4,215,030

[45] Jul. 29, 1980

[54] PHOTOGRAPHIC POLYESTER FILM SUPPORT

[75] Inventors: Tsutomu Okita; Masami Satou; Noburo Hibino, all of Fujinomiya; Kazunobu Katoh, Minami-ashigara; Hiroshi Sawaguchi, Odawara, all of Japan

[73] Assignee: Fuji Photo Film Co., Ltd., Minami-ashigara, Japan

[21] Appl. No.: 938,162

[22] Filed: Aug. 30, 1978

[30] Foreign Application Priority Data

Aug. 31, 1977 [JP] Japan ............................... 52-104401

[51] Int. Cl.[2] ........................... C08K 5/08; C08K 5/34

[52] U.S. Cl. ................................. 260/40 R; 430/512; 430/517

[58] Field of Search ...................... 260/40 R; 96/84 R

[56] References Cited

U.S. PATENT DOCUMENTS

| | | | |
|---|---|---|---|
| 1,994,876 | 3/1935 | Schneider et al. | 96/84 R |
| 3,184,457 | 5/1965 | Bronnock et al. | 96/84 R |
| 3,821,001 | 6/1974 | Weber | 96/84 R |
| 3,918,976 | 11/1975 | Arai et al. | 96/84 R |
| 3,948,664 | 4/1976 | Okuyama et al. | 96/84 R |

*Primary Examiner*—Sandra M. Person

*Attorney, Agent, or Firm*—Sughrue, Rothwell, Mion, Zinn and Macpeak

[57] ABSTRACT

A photographic polyester film support dyed with a dye having a main absorption peak in the wavelength range of about 350 to about 570 nm, a dye having a main absorption peak in the wavelength range of about 640 to about 680 nm, and a dye having a main absorption peak in the wavelength range of about 420 to about 460 nm which is represented by the following formula (I) or (II):

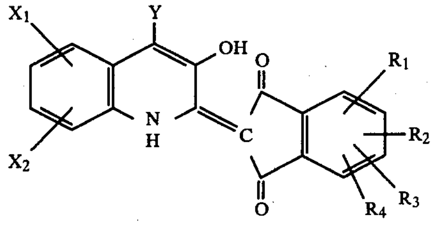

(I)

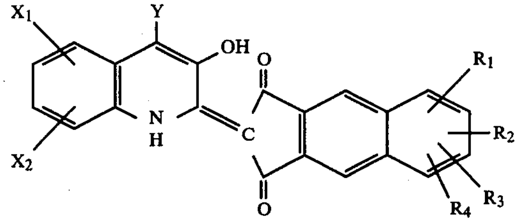

(II)

wherein $R_1$, $R_2$, $R_3$ and $R_4$, which may be the same or different, each represents —H, —OH, —$NH_2$, —$NHR_5$, —$NR_5R_6$, —Cl, —Br, an alkyl group having 4 or less carbon atoms or an alkoxy group having 4 or less carbon atoms; $R_5$ and $R_6$, which may be the same or different, each represents an alkyl group having 4 or less carbon atoms or an aryl group; $X_1$ and $X_2$, which may be the same or different, each represents —H, —Cl, —Br or an alkyl group having 4 or less carbon atoms; and Y represents —H, —Cl or —Br, with the proviso that $R_1$, $R_2$, $R_3$ and $R_4$ in the formula (I) are not simultaneously —H.

10 Claims, No Drawings

PHOTOGRAPHIC POLYESTER FILM SUPPORT

BACKGROUND OF THE INVENTION

1. Field of the Invention

The present invention relates to photographic film supports and, particularly, to photographic film supports wherein halation and light piping are prevented.

2. Description of the Prior Art

Generally, in supports for motion picture or recording films, halation and "light piping" (or "edge fogging") should be prevented. If such is not prevented, disadvantages occur. For example, when one frame in the film is exposed to light using a camera, (1) incident light scatters in the support or at the interface between the support and a subbing layer to cause formation of dim images due to the undesired exposure of the emulsion in that frame, and (2) incident light passes through the support and reaches another exposed or unexposed frame and the emulsion of the other frame is fogged.

In the past, photographic supports have been dyed to prevent halation and light piping.

For example, it is known that photographic supports can be dyed using red and green dyes, as described in Japanese Patent Application (OPI) Nos. 14245/72 and 5425/73 (The term "OPI" as used herein refers to a "published unexamined Japanese patent application"), and U.S. Pat. Nos. 2,622,026, 3,728,124 and 3,822,132. Further, photographic supports in which finely divided particles of pigments, such as carbon black or titanium oxide, have been incorporated are described in U.S. Pat. No. 3,340,062.

Light by which halation and light piping are caused is visible light, such as sunlight, etc. Accordingly, it would appear that halation and light piping can be prevented, if the photographic film supports were dyed to have an absorption over the entire spectral wavelength range of visible light. Thus, photographic film supports dyed to have a uniform absorption in the entire visible light wavelength range of about 400 to 700 nm are described in U.S. Pat. No. 2,622,026, column 1, lines 16 to 20.

Where photographic film supports are dyed using a mixture of a red dye and a green dye to prevent halation or light piping, there is the disadvantage that prevention of halation or light piping cannot be sufficiently obtained or the apparent sensitivity of the photographic emulsion decreases. Green dyes have main absorption peaks in the wavelength ranges of 400 to 500 nm and 600 to 700 nm. The main absorption peaks in these two wavelength ranges result in an optical density which is generally not the same, namely, the main absorption peak in one range results in an optical density which is higher than the optical density resulting from the main absorption peak in the other range. Therefore, the same optical densities in the wavelength range of 400 to 500 nm and the wavelength range of 600 to 700 nm are not obtained. Accordingly, sufficient prevention of halation and light piping is not obtained in the wavelength range having the lower optical density. Further, although sufficient prevention of halation or light piping can be attained by increasing the concentration of the green dye, if the concentration of the green dye is increased, incident light of the wavelength range having the higher optical density is absorbed by the support to cause the apparent sensitivity of the emulsion sensitized to this wavelength range to decrease.

Further, the method of incorporating finely divided particles of pigments, such as titanium oxide or carbon black etc., has the disadvantage that uniform dispersion of these pigments in the polymers of the support is difficult to achieve and the photographic film support becomes hazy (cloudy) and distinct images cannot be obtained.

By using three kinds of dyes comprising a yellow dye, a red dye and a blue dye and by selecting the mixing ratio thereof, photographic film supports in which the optical densities of each of the main absorption peaks in the wavelength ranges of 400 to 500 nm, 500 to 600 nm and 600 to 700 nm is the same can be obtained, by which deterioration of the sensitivity of the photographic light-sensitive material is minimized and sufficient prevention of halation and light piping can be obtained. Further, in color photographic emulsions having a poor color balance, it is possible to correct the color balance by changing the mixing ratio of the three kinds of dyes.

Dyes for dyeing polyester films for photographic film supports simultaneously must be heat resistant, compatible and sublimation resistant, must be inert to silver halide emulsions and must not adversely influence photographic properties, such as sensitivity, gamma or fog, etc.

Red and blue dyes for polyester films which satisfy these requirements are described in Japanese Patent Application (OPI) Nos. 14245/72 and 5425/73, Japanese Patent Publication Nos. 8734/72, 8735/72 and 33724/76 and U.S. Pat. Nos. 3,728,124, 3,822,132 and 3,933,502. However, no yellow dyes which satisfy the above-described requirements for polyester films are known, and it has been desired to provide yellow dyes which are heat resistant, compatible with polyesters and sublimation resistant, are inert to silver halide emulsions, do not adversely influence photographic properties, such as sensitivity, gamma or fog, etc., and have an absorption in the short wavelength side of the yellow absorption wavelength range of 400 to 500 nm.

SUMMARY OF THE INVENTION

According to the present invention, by using a specific yellow dye together with a dye which has a main absorption peak in the wavelength region of about 530 to about 570 nm (hereinafter referred to as "a red dye") and a dye which has a main absorption peak in the wavelength region of about 640 to about 680 nm (hereinafter referred to as "a blue dye"), photographic supports having a sufficient antihalation effect and a sufficient light piping preventing effect can be provided without adversely influencing the photographic properties.

Accordingly, a first object of the present invention is to provide photographic polyester film supports in which emulsion fogging caused by halation and light piping is prevented.

A second object of the present invention is to provide color photographic polyester supports in which blue fogging is prevented without causing deterioration in sensitivity.

A third object of the present invention is to provide photographic polyester film supports dyed with dyes which have good heat resistance, good compatibility with polyesters and good sublimation resistance and which do not adversely influence the photographic properties of photographic products when such are used as photographic supports.

A fourth object of the present invention is to provide photographic polyester supports for black-and-white photographic materials in which halation and light piping are prevented.

A fifth object of the present invention is to provide photographic supports for color photographic materials where color balance can be corrected.

Accordingly, this invention provides a photographic polyester film support dyed with a dye having a main absorption peak in the wavelength range of about 530 to about 570 nm, a dye having a main absorption peak in the wavelength range of about 640 to about 680 nm and a dye having a main absorption peak in the wavelength range of about 420 to about 460 nm which is represented by the following formula (I) or (II):

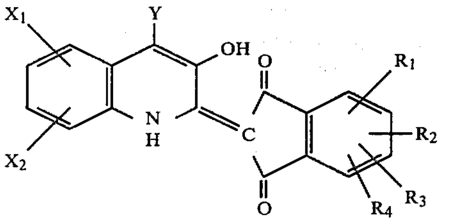

(I)

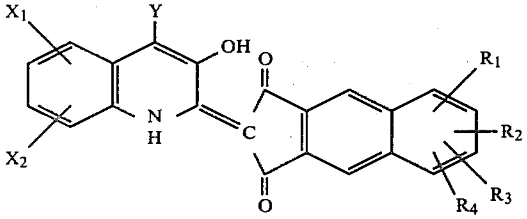

(II)

wherein $R_1$, $R_2$, $R_3$ and $R_4$, which may be the same or different, each represents —H, —OH, —$NH_2$, —$NHR_5$, —$NR_5R_6$, —Cl, —Br, an alkyl group having 4 or less carbon atoms or an alkoxy group having 4 or less carbon atoms; $R_5$ and $R_6$, which may be the same or different, each represents an alkyl group having 4 or less carbon atoms or an aryl group; $X_1$ and $X_2$, which may be the same or different, each represents —H, —Cl, —Br or an alkyl group having 4 or less carbon atoms; and Y represents —H, —Cl or —Br, with the proviso that $R_1$, $R_2$, $R_3$ and $R_4$ in the formula (I) are not simultaneously —H.

DETAILED DESCRIPTION OF THE INVENTION

The yellow dyes represented by the above-described formulas (I) and (II) have superior sublimation resistance and heat resistance to prior art yellow dyes used as yellow dyes for photographic film supports and have the advantage that a high optical density is obtained using a small amount of the dye. In the formulas (I) and (II), the reason why the number of carbon atoms in the alkyl group and the alkoxy group is limited to 4 or less is because dyes having an alkyl or alkoxy group with 5 or more carbon atoms have a low optical density as compared to dyes having an alkyl or alkoxy group having 4 or less carbon atoms when employed in an equivalent amount. Further, 3′-hydroxyquinophthalone in which $R_1$, $R_2$, $R_3$ and $R_4$ in the formula (I) are simultaneously hydrogen has the defect of poor sublimation resistance.

Suitable preferred alkyl groups for $R_1$, $R_2$, $R_3$, $R_4$, $R_5$, $R_6$, $X_1$ and $X_2$ include straight chain alkyl groups and branched chain alkyl groups, such as a methyl group, an ethyl group, a propyl group, a butyl group, an isopropyl group, and a t-butyl group.

Suitable preferred alkoxy groups for $R_1$, $R_2$, $R_3$ and $R_4$ include those containing straight chain or branched chain alkyl moieties, such as a methoxy group, an ethoxy group, a propoxy group, a butoxy group, an isopropoxy group and a t-butoxy group.

Suitable preferred aryl groups for $R_5$ and $R_6$ include a phenyl group.

In order to obtain a high optical density using a small amount of the dye, the sum total of the number of carbon atoms in $R_1$, $R_2$, $R_3$ and $R_4$ is preferably small and more specifically is preferably 6 or less.

Specific examples of yellow dyes represented by the general formulas (I) and (II) include (1) 4,3′-Dihydroxyquinophthalone
(2) 4-Amino-3′-hydroxyquinophthalone
(3) 3′-Hydroxy-5,6-dichloroquinophthalone
(4) 4-Methyl-3′-hydroxyquinophthalone
(5) 5-Ethyl-3′-hydroxyquinophthalone
(6) 3′-Hydroxy-5,6-dimethoxyquinophthalone
(7) 3′-Hydroxy-5,6-dichloroquinophthalone
(8) 3′-Hydroxybenzoquinophthalone
(9) 5,3′-Dihydroxybenzoquinophthalone
(10) 5-Amino-3′-hydroxybenzoquinophthalone
(11) 3′-Hydroxy-6,7-dichloroquinophthalone
(12) 5-Methoxy-3′-hydroxybenzoquinophthalone
(13) 4-Methoxy-3′-hydroxyquinophthalone
(14) 5-Methoxy-3′-hydroxyquinophthalone
(15)

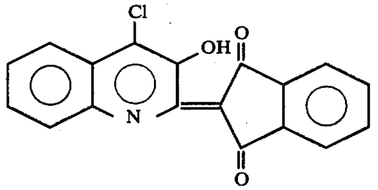

(15)

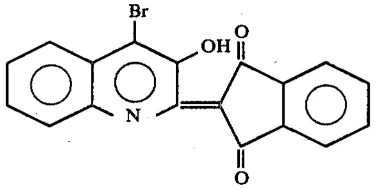

(16)

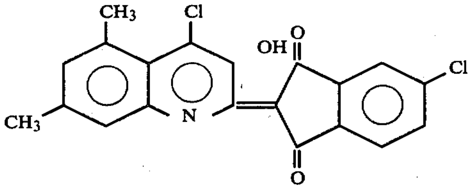

(17)

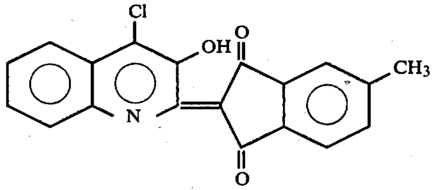

(18)

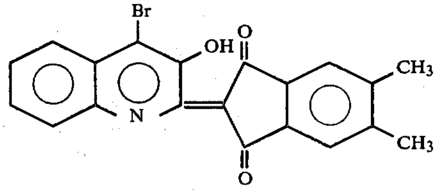

(19)

-continued

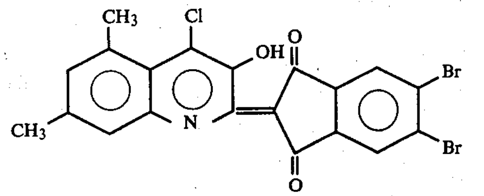
(20)

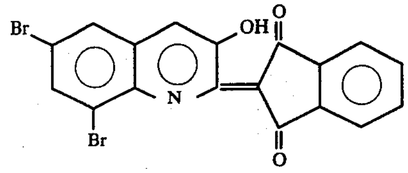
(21)

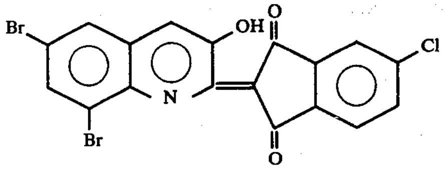
(22)

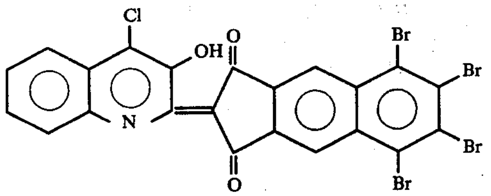
(23)

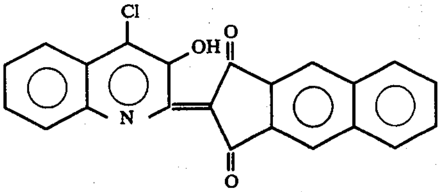
(24)

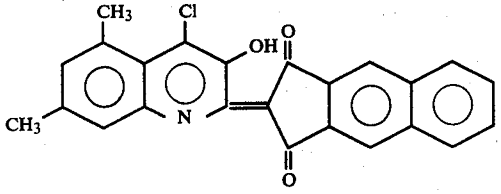
(25)

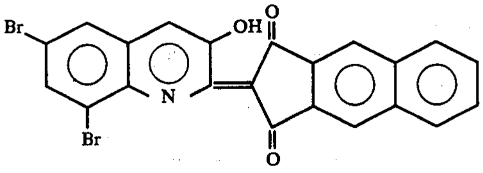
(26)

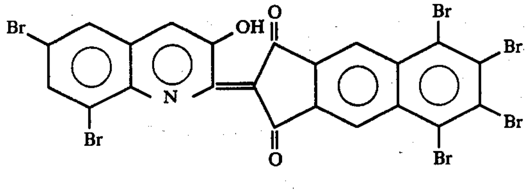
(27)

Particularly preferred dyes of the formulas (I) and (II) are those represented by the following formulas (III) and (IV).

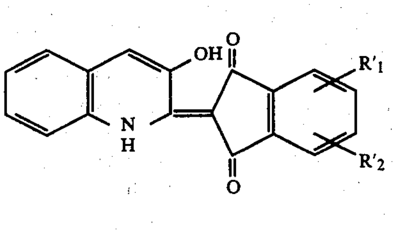
(III)

-continued

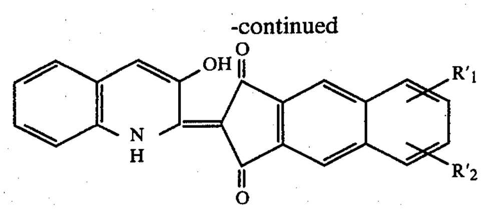
(IV)

wherein R'$_1$ and R'$_2$, which may be the same or different, each represents —H, —OH, —$CH_3$, —$C_2H_5$, —$CH(CH_3)_2$, —$C(CH_3)_3$, —$OCH_3$, —$OC_2H_5$, —$OCH(CH_3)_2$ or —$O(CH_3)_3$, with R'$_1$ and R'$_2$ in the formula (III) not simultaneously being hydrogen.

Preferred specific examples include 4-methyl-3'-hydroxyquinophthalone, 4-methoxy-3'-hydroxyquinophthalone, 3'-hydroxybenzoquinophthalone and 5-methoxy-3'-hydroxyquinophthalone.

Since polyester films have a very stable physical structure, it is difficult to dye polyester films by dyeing them using a solvent. Therefore, a dope-dyeing method which comprises admixing a dye and dissolving such in a polyester during the synthesis of the polymer or during molding by melting the polyester and the dye with heat is preferred. Accordingly, coloring dyes must have high heat stability to withstand molding temperature of about 270° to about 300° C. and must not discolor and fade due to decomposition. High heat resistance of the dyes is also necessary, because products formed by heat decomposition adversely influence the photographic properties. Further, this method has the advantage that the dyeing can be carried out simultaneously with molding and another step is not necessary.

In dope-dying, the coloring dyes must easily and uniformly disperse or dissolve in the polyester. Particularly, in photographic film support uses, since high transparency and no optical defects are essential, not the least bit of cloudiness can occur in the support due to insufficient dispersion of the coloring dyes or granular substances included in the support. As is well known, in polyesters, amorphous non-oriented films which are melt-molded should be stretched and heat treated at a suitable temperature so as to obtain advantageous properties. Accordingly, even if the dyes are uniformly dispersed in an amorphous nonoriented film and the apparent transparency is not harmed, cloudiness of the film very often increases, because air gaps are formed between the finely divided particles of the dyes, which do not undergo a plastic deformation, and the polyester matrix which is capable of undergoing a large plastic deformation in the next stretching step, with light being thereby scattered. Accordingly, in the production of, particularly, photographic film supports, sufficient precautions should be taken so that the dyes are dispersed as very small particles or dissolved as a molecular dispersion so that air gaps are not formed during the stretching.

On the other hand, since polyester films are usually molded using a tenter method, the film edges are inevitably not used. In order to reclaim these film edges, the film edges are collected and crushed and dried together with virgin polyester chips. Where the edges are dyed using dyes having poor sublimation resistance, the dyes sublime from the dyed waste edges during drying. Accordingly, not only are the dyes lost, but also the dryer is contaminated by the dyes which fall from the extrusion die to result in uneven dyeing. Further, where the polyester is dyed using dyes which easily sublime, when the polyester is extruded from an extrusion die onto a casting drum and cooled, the dyes sublime and contaminate the casting drum and uneven dyeing occurs in the dyed film. Therefore, it is important to dye using dyes which have good sublimation resistance.

Far higher heat resistance compatibility with polyester and sublimation resistance are required for dyeing photographic film supports as compared to dyeing of fibers.

Further, dyes for dyeing photographic film supports must be inert to the silver halide emulsions and must not adversely influence the photographic properties, such as sensitivity, gamma or fog, etc. Accordingly, only a very limited number of dyes can be used for dyeing photographic polyester bases.

Accordingly, whether dyes would be suitable for use in dyeing photographic polyester bases cannot be predicted from dyes which can be used for dyeing polyesters, in general.

For example, known yellow dyes which can be used for dyeing high molecular weight materials such as polyesters, which are to some extent heat resistant, compatible with polyesters and sublimation resistant, include 1,5-dinitroanthraquinone, 1,5-anthraquinone disulfonic acid, 1-[o-(β-hydroxyethylmercapto)benzamido]anthraquinone, 1,5-bis[p-(β-hydroxyethoxy)-benzothio]anthraquinone and bis(β-hydroxyethyl)ester of 1,5-bis(o-carboxyphenylthio)anthraquinone. However, these known yellow dyes cannot be used for dyeing polyester photographic film supports because they all adversely influence the photographic properties. It can be seen from the above how difficult the selection of yellow dyes for photographic supports is.

Red dyes having a main absorption peak in the wavelength range of about 530 to 570 nm which can be used in the present invention together with the yellow dyes represented by the formulas (I) and (II) above include, for example, anthraquinone dyes, triphenylmethane dyes, nitro dyes, stilbene dyes, indigoid dyes and thiazine dyes. Of these dyes, particularly preferred red dyes are represented by the following formula (V)

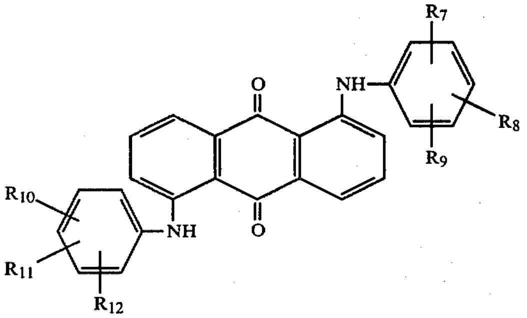

(V)

wherein $R_7$, $R_8$, $R_9$, $R_{10}$, $R_{11}$ and $R_{12}$, which may be the same or different, each represents —H, —OH, —$NH_2$, —$NHR_{13}$, —$NR_{13}R_{14}$, —Cl, —Br, an alkyl group having 4 or less carbon atoms (e.g., as described above), or an alkoxy group having 4 or less carbon atoms (e.g., as described above); and $R_{13}$ and $R_{14}$ each has the same meanings as $R_5$ and $R_6$ in the general formulas (I) and (II).

Suitable specific examples of red dyes which can be used include 1,5-bis(-anisidino)anthraquinone, 1,5-bis(p-toluidino)anthraquinone, 1,5-bis(m-toluidino)anthraquinone, etc.

Suitable blue dyes having a main abosrption peak in the wavelength range of about 640 to 680 nm which can be used in this invention include, for example, anthraquinone dyes, triphenylmethane dyes, nitro dyes, nitroso dyes, stilbene dyes, indigoid dyes and thiazine dyes. Of these blue dyes, particularly preferred dyes have the following formula (VI)

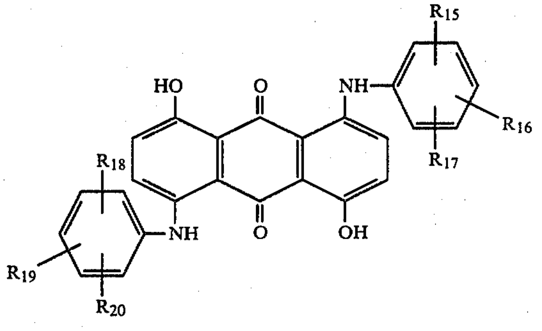

(VI)

wherein $R_{15}$, $R_{16}$, $R_{17}$, $R_{18}$, $R_{19}$ and $R_{20}$, which may be the same or different, each represents —H, —OH, —$NH_2$, —$NHR_{21}$, —$NR_{21}R_{22}$, —Cl, —Br, an alkyl group having 4 or less carbon atoms (e.g., as described above) or an alkoxy group having 4 or less carbon atoms (e.g., as described above); and $R_{21}$ and $R_{22}$ each has the same meanings as $R_5$ and $R_6$ in the general formulas (I) and (II).

Suitable specific examples of blue dyes which can be used include 1,5-bis(o-toluidino)-4,8-dihydroxyanthraquinone, 1,5-bis(p-nisidino)-4,8-dihydroxyanthraquinone, 1,5-bis(p-toluidino)-4,8-dihydroxyanthraquinone, etc.

Particularly, when a yellow dye represented by the formula (I) or (II) above is mixed with a red dye represented by the formula (V) above and a blue dye represented by the formula (VI) above and the mixture of granulated dyes is continuously supplied to polyester, substantially no uneven dyeing occurs. This is because the yellow dyes represented by the formulas (I) and (II), the red dyes represented by the formula (V) and the blue dyes represented by the formula (VI) have good solubility in solvents and the three dyes are uniformly mixed to form particles by granulating.

Known methods for continuously dope-dyeing of polyesters include a method which comprises continuously supplying dyes in a granulated state using a table feeder and a method which comprises continuously supplying master pellets containing a high concentration of colorant. However, in dyeing using a multicolor dye mixture, uneven dyeing easily occurs, because the properties of dyes (e.g., decomposability or dispersibility of the dyes) are different. However, when 3'-hydroxybenzoquinophthalene is used as a yellow dye, 1,5-bis(p-anisidino)anthraquinone, 1,5-bis(p-toluidino)anthraquinone, or 1,5-bis(m-toluidino)anthraquinone is used as a red dye and 1,5-bis(o-toluidino)-4,8-dihydroxyanthraquinone, 1,5-bis(p-anisidino)-4,8-dihydroxyanthraquinone, or 1,5-bis(p-toluidino)-4,8-dihydroxyanthraquinone is used as a blue dye, uneven dyeing does not occur. The reason is believed because the three dyes described above uniformly dissolve in the solvent when they are granulated, and the three dyes homogeneously coagulate in the resulting particles. The term "granulate" as used herein means that, after the dyes have been dissolved in a solvent having a low boiling point (e.g., about 100° C. or less), such as methylene chloride, acetone, methanol, etc., the dyes are coagulated upon evaporation of the solvent to obtain finely divided dye particles for the purpose of preventing uneven feeding of the dyes when dyeing is carried out.

Preferred amounts of dyes for roll films are amounts for each dye whereby an optical density of about 0.03 to about 0.15 and, preferably, 0.04 to 0.10, for each main absorption peak in the wavelength regions of about 420 to about 460 nm, about 530 to about 570 nm and about 640 to about 680 nm is obtained. When the optical density is less than about 0.03, sufficient antihalation effect and sufficient light piping preventing effect is not obtained. When the optical density is more than about 0.15, the exposure is reduced resulting in a deterioration of the apparent sensitivity of the emulsions. Further, in film units for use in the diffusion transfer process, it is preferred for the optical density of each spectral absorption of the main absorption peaks in the wavelength regions of about 420 to 460 nm, about 530 to 570 nm and about 640 to 680 nm to be about 0.01 to about 0.08 and, particularly, 0.02 to 0.06. If the optical density is less than about 0.01, sufficient light piping prevention effect cannot be obtained. If the optical density is more than about 0.08, the developed images have a grayish look reducing the commercial value thereof.

Suitable polyesters which can be used in the present invention are those which have been used generally for photographic supports. Specific examples of polyesters which can be used include polyethylene terephthalate, polyethylene naphthalate, polyethylene cyclohexyldicarboxylate, polybutylene terephthalate and polyethylene naphthalate, etc.

Methods of coloration which can be used include not only a method which comprises feeding the dyes just before film formation by melting both the polyester and the dyes but also a method which comprises adding dyes during production of the polymer.

Suitable methods of feeding the dyes include particularly a method which comprises continuously feeding with a table feeder after granulating and classifying the particles obtained.

Photographic emulsions which can be coated on the photographic film supports thus-obtained include color positive photographic emulsions, color negative photographic emulsions, photographic emulsions for films for use in the diffusion transfer process, photographic emulsions for microfilms, black-and-white photographic emulsions, photographic emulsions for movie films and diffusion transfer photographic materials as described in, for example, U.S. Pat. Nos. 4,053,312, 3,443,943, 3,227,550, and 2,983,606, etc.

Since the support is dyed with the three yellow, red and blue dyes, the present invention is useful, particularly, with color photographic emulsions, because the apparent spectral sensitivity of the emulsion coated on the support can be adjusted by selecting the mixing ratio of the three yellow, red and blue dyes for dyeing the support and by selecting dyes each having a main absorption peak in a different wavelength range, even in a case of a color photographic emulsion having a poor color balance.

The present invention is illustrated more specifically by reference to the following examples. Unless otherwise indicated, all parts, percents, ratios and the like are by weight.

EXAMPLE 1

3′-Hydroxybenzoquinophthalone (λ max: 444 nm), 1,5-bis(p-anisidino)anthraquinone (λ max: 554 nm) and 1,5-bis(o-toluidino)-4,8-dihydroxyanthraquinone (λ max: 660 nm) in a weight ratio of 2:5:7 were incorporated into polyethylene terephthalate in an amount of 0.02% by weight. The polyethylene terephthalate mixture was melted, e.g., at 280° to 300° C., in an extruder and extruded at 280° to 300° C. in the form of a sheet from a slit die. The extruded molten sheet was cooled rapidly to 50° C. using a cooling roll and the sheet was subjected to conventional processing comprising stretching in the length direction between a pair of low speed rolls and a pair of high speed rolls, stretching in the width direction using a tenter and heat-setting at 200° L to 220° C. in the tenter to produce a film having a thickness of 100μ. The optical density of this film in the wavelength region of 400 to 700 nm was 0.04 to 0.06.

An aqueous dispersion of vinylidene chloride-methyl acrylate-hydroxyethyl acrylate copolymer (copolymerization weight ratio: 83:12:5; concentration: 2 wt%) was coated on this, Then, a blue-sensitive silver iodobromide emulsion layer (silver iodide: 6% by mol) containing a yellow coupler emulsified dispersion, a green-sensitive silver iodide emulsion layer (silver iodide: 6% by mol) containing a magenta coupler emulsified dispersion, a red-sensitive silver iodobromide emulsion layer (silver iodide: 6% by mol) containing a cyan coupler emulsified dispersion) and a gelatin layer containing an ultraviolet light absorbing agent were applied thereto to produce a color negative film. Each coupler emulsified dispersion used was prepared by dissolving the coupler in a mixture of dibutyl phthalate and tricresyl phosphate and dispersing the coupler solution in a gelatin aqueous solution so as to obtain an O/W type emulsion using Turkey red oil and sodium dodecylbenzenesulfonate as dispersing agents.

α-(2,4-Dioxo-5,5′-dimethyloxazolidinyl)-α-pivaloyl-2-chloro-5-[α-(2,4-di-t-amylphenoxy)-butyramido]acetanilide, 1-(2,4,6-trichlorophenyl)-3-[(2-chloro-s-tetradecanamido)-anilino]-2-pyrazoline-5-one and 2-[α-(2,4-di-t-amylphenoxy)-butyramido]-4,6-dichloro-5-methylphenol were used as yellow, magenta and cyan couplers, respectively. Further, a compound having the following chemical formula (a):

(a)

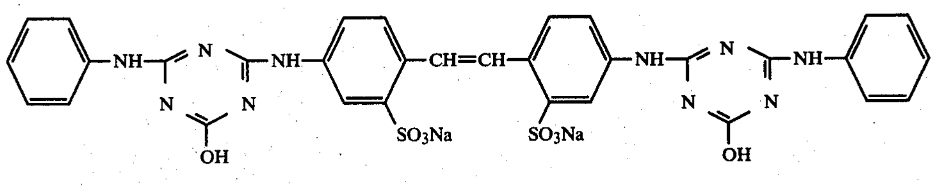

was used as the ultraviolet light absorbing agent. 6-Methyl-4-hydroxy-1,3,3a,7-tetrazaindene was used as an antifogging agent in the emulsion.

The amounts of the couplers and the silver halide coated in this negative film were as follows:

| | Amount of Coupler Coated | Amount of Silver Halide Coated |
|---|---|---|
| | $(g/m^2)$ | $(g/m^2)$ |
| Red Sensitive Layer | 0.4 | 0.5 |
| Green-Sensitive Layer | 0.5 | 0.6 |
| Blue-Sensitive Layer | 0.4 | 0.8 |

Light Piping Evaluation

One end of a sample of the thus-resulting color negative film was shielded from light and the other end of the film was exposed to sunlight of about 120,000 lux for 10 minutes. The color negative film was then processed in the following manner.

| Processing Steps | | |
|---|---|---|
| Color Development | 31° C. | 3 minutes and 30 seconds |
| Bleach-Fix | 31° C. | 1 minute and 30 seconds |
| Water Wash | 31° C. | 2 minutes |
| Stabilizing | 31° C. | 1 minute |

The processing solutions used had the following compositions.

| | |
|---|---|
| Color Developing Solution | |
| Benzyl Alcohol | 14 ml |
| Sodium Sulfite | 2 g |
| Potassium Bromide | 0.5 g |
| Sodium Carbonate (monohydrate) | 30 g |
| 4-Amino-N-ethyl-N-(β-methanesulfonamido)-m-toluidine Sesquisulfate (monohydrate) | 4.5 g |
| Water to make | 1 l |
| Bleach-Fix Solution | |
| Ammonium Thiosulfate (70% aq. soln.) | 150 ml |
| Sodium Sulfite | 5 g |
| Na[Fe(EDTA)] | 40 g |
| EDTA | 4 g |
| Water to make | 1 l |
| (EDTA is ethylenediamine tetraacetic acid) | |
| Stabilizing Solution | |
| Glacial Acetic Acid | 10 ml |
| Sodium Acetate | 5 g |
| Formaldehyde (37% aq. soln.) | 5 ml |
| Water to make | 1 l |
| Halation Evaluation | |

After another sample of the resulting color negative film was exposed to light (500 C.M.S.) using a sensitometer, the color negative film was processed in the same manner as in the light piping test.

The results obtained on carrying out the two tests showed no fog caused by halation and light piping, and good images having a clear color tone were obtained. Further, the dyes did not fade from the time of film formation to development and they did not adversely influence the film forming step and the development step.

EXAMPLE 2

A container retaining a processing solution and rupturable due to pressure was attached to one end of a light-sensitive sheet on which color photographic emulsions had been coated. A cover sheet produced as described below was combined therewith so that Surface A of the cover sheet faced the light-sensitive sheet, and a light piping test was then carried out.

The cover sheet was produced as described below.

3'-Hydroxy-4-methylquinophthalone (λ max: 455 nm), 1,5-bis(p-toluidino)anthraquinone (λ max: 554 nm) and 1,5-bis(o-toluidino)-4,8-dihydroxyanthraquinone (λ max: 660 nm) in a ratio by weight of 1:5:6 were incorporated into polyethylene terephthalate in total amount of 0.006% by weight, and a film base having a thickness of 100μ was produced in the same manner as described in Example 1. The optical density of this film in the wavelength range of 400 to 700 nm was 0.015 to 0.030.

Subbing Solution (1) of the following composition was coated on one surface (Surface A) of this film at a coverage of 40 $ml/m^2$ and dried at 120° C. for 3 minutes.

| Subbing Solution (1) | |
|---|---|
| Aqueous Dispersion of Vinylidene Chloride-Methyl Methacrylate-Hydroxyethyl Acrylate Copolymer (copolymerization ratio (by weight): 83:12:5; concentration: 50% by weight) | 4 g |
| Water to make | 100 ml |

Subbing Solution (2) having the following composition was coated on this first undercoated layer at a coverage of 40 $ml/m^2$ and dried at 100° C. for 2 minutes.

| Subbing Solution (2) | |
|---|---|
| Reaction Product of Polyamide (obtained from diethylenetriamine and adipic acid) and Epichlorohydrin | 0.07 g |
| Gelatin | 1.0 g |
| Saponin | 0.01 g |
| Water to make | 100 ml |

A subbing layer having the following composition and an anticurling antistatic layer having the following composition were coated in turn on the other surface (Surface B) of the film produced as described above.

| | |
|---|---|
| Subbing Layer (coated amount: 40 $ml/m^2$) | |
| Vinylidene Chloride-Methyl Acrylate-Hydroxyethyl Acrylate Copolymer (copolymerization ratio (by weight): 85:8:7; concentration: aqueous dispersion of 50% by weight) | 3 g |
| Saponin | 0.001 g |
| Water to make | 100 ml |
| Anticurling Antistatic Layer (coated amount: 120 $g/m^2$) | |
| Cellulose Diacetate | 8 g |
| Acetone | 80 ml |
| Methanol | 20 ml |
| Poly-N-methacryloxyethyl-N,N,N-triethylammonium Salt | 0.7 g |

The following layers were coated in turn onto Surface A. Coating was carried out by dip coating. The "$g/m^2$" shown below indicates the coated amount after drying.

Acid Polymer Layer

Polyacrylic Acid (22 $g/m^2$) (degree of polymerization: about 10,000)

Neutralization Timing Layer

Cellulose Diacetate (5 $g/m^2$) (degree of acetylation: 40%; degree of polymerization: 130–160)

The light-sensitive sheet was produced as described below.

The following layers were coated in turn on a transparent polyethylene terephthalate support having a thickness of 180μ.

(1) A layer containing a mordant (3.0 g/m$^2$) of the following formula

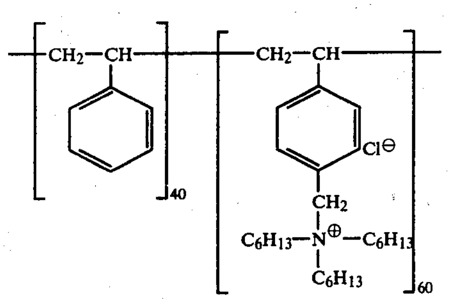

and gelatin (3.0 g/m$^2$)

(2) A layer containing titanium dioxide (20 g/m$^2$) and gelatin (2.0 g/m$^2$)

(3) A layer containing carbon black (2.5 g/m$^2$) and gelatin (2.5 g/m$^2$)

(4) A layer containing a cyan dye image providing material (0.50 g/m$^2$) of the following formula

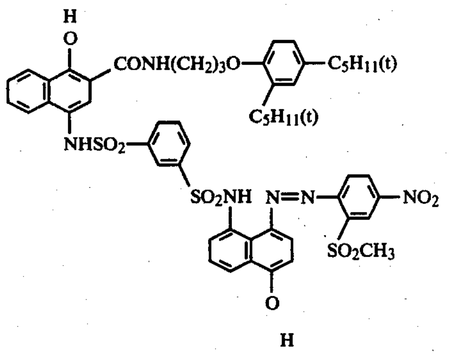

diethyllaurylamide (0.25 g/m$^2$) and gelatin (1.14 g/m$^2$)

(5) A layer containing a red-sensitive internal latent image type direct reversal emulsion (silver iodobromide: 1.9 g/m$^2$ as silver; gelatin: 1.4 g/m$^2$; I content: 6 mol%), a fogging agent (0.028 g/m$^2$) represented by the following formula

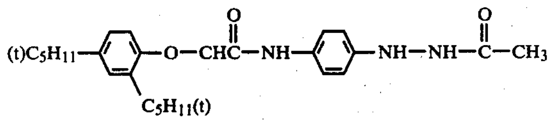

and sodium dodecylhydroquinone sulfonate (0.13 g/m$^2$)

(6) A layer containing gelatin (2.6 g/m$^2$) and 2,5-dioctylhydroquinone (1.0 g/m$^2$)

(7) A layer containing a magenta dye image providing material (0.45 g/m$^2$) of the following formula

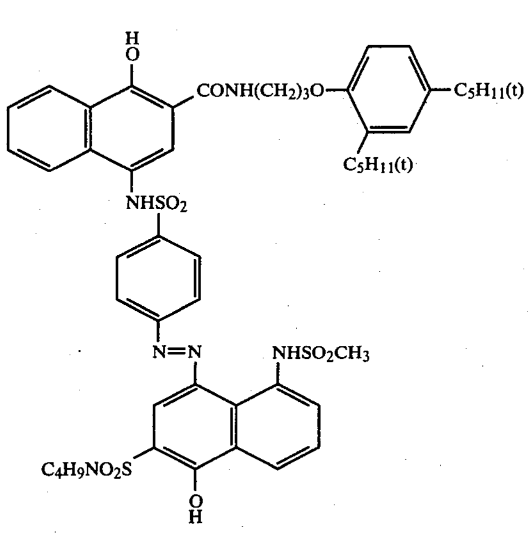

diethyllaurylamide (0.10 g/m$^2$), 2,5-di-t-butylhydroquinone (0.0074 g/m$^2$) and gelatin (0.76 g/m$^2$)

(8) A layer containing a green-sensitive internal latent image type direct reversal emulsion (silver iodobromide: 1.4 g/m$^2$ as silver; gelatin: 1.0 g/m$^2$; I content: 6 mol%), the same fogging agent as in Layer (5) (0.024 g/m$^2$) and sodium dodecylhydroquinone sulfonate (0.11 g/m$^2$)

(9) A layer containing gelatin (2.6 g/m$^2$) and 2,5-dioctylhydroquinone (1.0 g/m$^2$)

(10) A layer containing a yellow dye image providing material (0.78 g/m$^2$) of the following formula

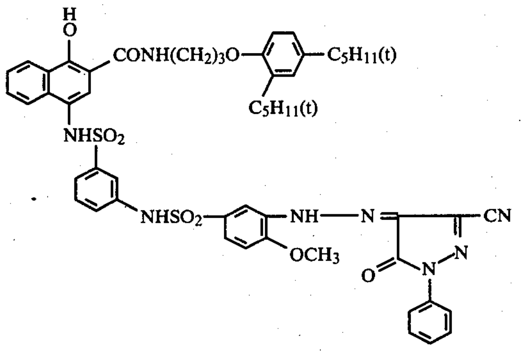

diethyllaurylamide (0.16 g/m$^2$), 2,5-di-t-butylhydroquinone (0.012 g/m$^2$) and gelatin (0.78 g/m$^2$)

(11) A blue-sensitive internal latent image type direct reversal emulsion (silver iodobromide: 2.2 g/m$^2$, as silver; gelatin: 1.7 g/m$^2$; I content: 6 mol%), the same fogging agent as in Layer (5) (0.020 g/m$^2$) and sodium dodecylhydroquinone sulfonate (0.094 g/m$^2$)

(12) A layer containing gelatin (0.94 g/m$^2$)

Processing Solution

A processing solution having the following composition was placed in a container which was rupturable under pressure.

| Processing Solution Composition | |
|---|---|
| 1-Phenyl-4-methyl-4-hydroxymethyl-pyrazolone | 10 g |
| Methylhydroquinone | 0.18 g |
| 5-Methylbenzotriazole | 4.0 g |
| Sodium Sulfite (anhydrous) | 1.0 g |

-continued

| Processing Solution Composition | |
|---|---|
| Na Carboxymethylcellulose | 40.0 g |
| Carbon Black | 150 g |
| Potassium Hydroxide (28% aq. soln.) | 200 cc |
| Water | 550 cc |

Light Piping Evaluation

The cover sheet and the light-sensitive sheet were cut to a size of 10 cm×10 cm and combined with the processing solution to produce a film unit for use in the diffusion transfer process. A cassette: Kodak Instant Print Film PR-10 (trademark of the Eastman Kodak Co.) was loaded with one of the resulting film units. After exposure using outdoor sunlight of 12 lux, development was carried out in situ to obtain an instant print. Distinct images having a good color tone were obtained in the thus-obtained film without the occurrence of fog due to halation or light piping. Further, the dyes in the polyester did not fade during film formation and development processing, and they did not adversely influence the film formation step and the development processing step.

COMPARISON EXAMPLE 1

A photographic film was produced in the same manner as described in Example 1 except that two dyes, 1,5-bis(p-anisidino)anthraquinone and 1,5-bis(o-toluidino)-4,8-dihydroxyanthraquinone in a mixing ratio of 3:2 (by weight), were added in an amount of 0.02% by weight based on the polyethylene terephthalate instead of the dyes for the polyethylene terephthalate used in Example 1. After the same light piping evaluation as described in Example 1 was carried out, the photographic film was subjected to development, fixing, water wash and stabilization processing in the same manner as described in Example 1. The resulting film had a marked degree of blue fog due to light piping and good images were not obtained.

COMPARISON EXAMPLE 2

A photographic film was produced in the same manner as described in Example 1 except that three dyes, 1,5-dinitroanthraquinone, 1,5-bis(p-anisidino)anthraquinone and 1,5-bis-(o-toluidino)-4,8-dihydroxyanthraquinone in a mixing ratio of 1:3:2 (by weight), were added in an amount of 0.02% by weight based on the polyethylene terephthalate instead of the dyes for the polyethylene terephthalate used in Example 1. Then, a light piping evaluation was carried out in the same manner as described in Example 1. After a light shielding part was exposed to light (500 C.M.S.) using a sensitometer in the same manner as described in Example 1, the film was subjected to development, fixing, water wash and stabilization processing in the same manner as described in Example 1. Although fogging due to light piping was not observed in the resulting film, the exposed areas became darkish as a whole and, consequently, distinct images were not obtained.

The following conclusions can be drawn from the results set forth in these Examples and Comparison Examples.

(1) If a dye having a main absorption peak in the wavelength range of about 420 to about 460 nm is not present, light of a wavelength of 400 to 500 nm is not absorbed in the support and the emulsion which is sensitive to that wavelength range (blue-sensitive emulsion) is fogged, by which the images become bluish as a whole and images having a good color tone cannot be obtained.

(2) It is most effective for preventing blue fog for the support to be dyed with a dye mixture having a main absorption peak in each of three wavelength ranges of about 420 to about 460 nm, about 530 to about 570 nm and about 640 to about 680 nm.

(3) Yellow dyes described by the general formulas (I) and (II) are effective for antihalation and for preventing light piping and they do not adversely influence the photographic properties.

While the invention has been described in detail and with reference to specific embodiments thereof, it will be apparent to one skilled in the art that various changes and modifications can be made therein without departing from the spirit and scope thereof.

What is claimed is:

1. A photographic polyester film support comprising a polyester dope-dyed with (a) a dye which has a main absorption peak in the wavelength range of about 530 to about 570 nm, (b) a dye which has a main absorption peak in the wavelength range of about 640 to about 680 nm and (c) a dye which has a main absorption peak in the wavelength range of about 420 to about 460 nm and represented by the following formula (I) or (II):

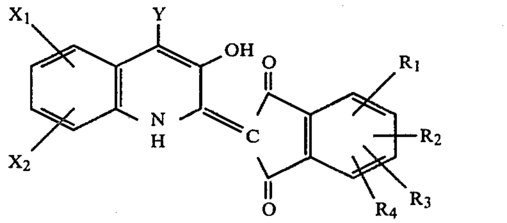

(I)

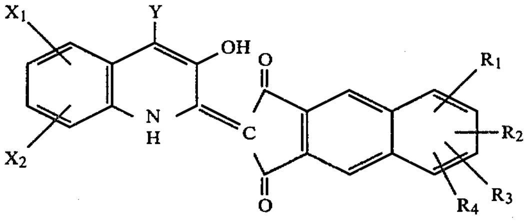

(II)

wherein $R_1$, $R_2$, $R_3$ and $R_4$, which may be the same or different, each represents —H, —OH, —$NH_2$, —$NHR_5$, —$NR_5R_6$, —Cl, —Br, an alkyl group having 4 or less carbon atoms or an alkoxy group having 4 or less carbon atoms; $R_5$ and $R_6$, which may be the same or different, each represents an alkyl group having 4 or less carbon atoms or an aryl group; $X_1$ and $X_2$, which may be the same or different, each represents —H, —Cl, —Br or an alkyl group having 4 or less carbon atoms; and Y represents —H, —Cl or —Br, with the proviso that $R_1$, $R_2$, $R_3$ and $R_4$ in the formula (I) are not simultaneously —H.

2. The photographic polyester film support of claim 1, wherein dye (a) has a main absorption peak in the wavelength range of about 650 to about 670 nm, dye (b) has a main absorption peak in the wavelength range of about 540 to about 560 nm and dye (c) has a main absorption peak in the wavelength range of about 430 to about 460 nm.

3. The photographic polyester film support of claim 1, wherein the optical density of the spectral absorption in the wavelength range of 400 to 700 nm is 0.1 or less.

4. The photographic polyester film support of claim 1, wherein the optical density of the spectral absorption in the wavelength range of 400 to 700 nm is 0.01 to 0.08.

5. The photographic polyester film support of claim 1, wherein said dye (c) represented by the formula (I) or (II) is a dye represented by the formula (III) or (IV):

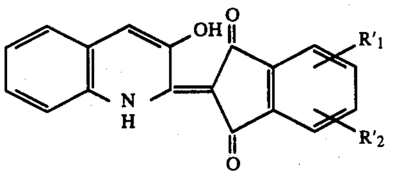

(III)

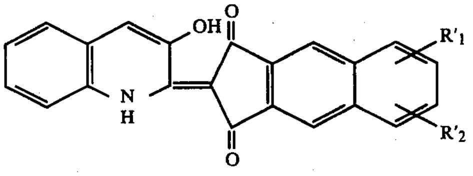

(IV)

wherein $R'_1$ and $R'_2$, which may be the same or different, each represents —H, —OH, —$CH_3$, —$C_2H_5$, —$CH(CH_3)_2$, —$C(CH_3)_3$, —$OCH_3$, —$OC_2H_5$, —$OCH(CH_3)_2$ or $OC(CH_3)_3$, with the proviso that $R'_1$ and $R'_2$ in the general formula (III) are not simultaneously —H.

6. The photographic polyester film support of claim 1, wherein dye (c) is 3'-hydroxy-4-methyl-quinophthalone or 3'-hydroxybenzoquinophthalone.

7. The photographic polyester film support of claim 1, wherein dye (b) is a dye represented by the following formula (V):

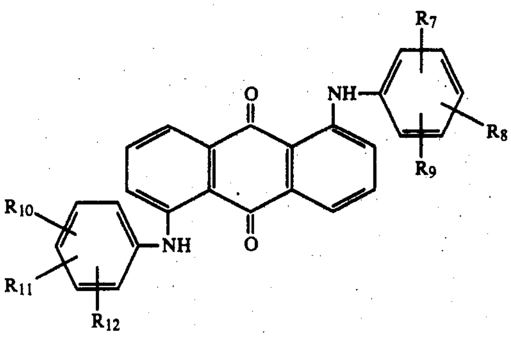

(V)

wherein $R_7$, $R_8$, $R_9$, $R_{10}$, $R_{11}$ and $R_{12}$, which may be the same or different, each rerpesents —H, —OH, —$NH_2$, —$NHR_{13}$, —$NR_{13}R_{14}$, —Cl, —Br, an alkyl group having 4 or less carbon atoms or an alkoxy group having 4 or less carbon atoms; and $R_{13}$ and $R_{14}$ each has the same meaning as $R_5$ and $R_6$ in the general formulas (I) and (II).

8. The photographic polyester film support of claim 1, wherein dye (a) is a dye represented by the following formula (VI):

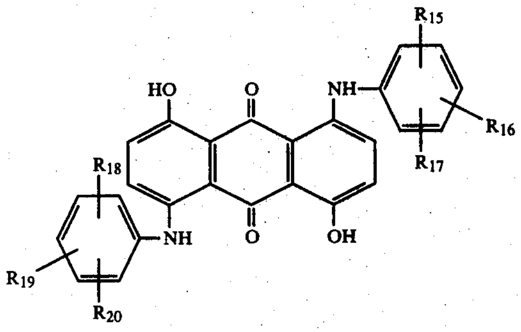

(VI)

wherein $R_{15}$, $R_{16}$, $R_{17}$, $R_{18}$, $R_{19}$ and $R_{20}$, which may be the same or different, each represents —H, —OH, —$NH_2$, —$NHR_{21}$, —$NR_{21}R_{22}$, —Cl, —Br, an alkyl group having 4 or less carbon atoms or an alkoxy group having 4 or less carbon atoms; and $R_{21}$ and $R_{22}$ each has the same meaning as $R_5$ and $R_6$ in the general formulas (I) and (II).

9. The photographic polyester film support of claim 1, wherein the optical density due to the main absorption peak of the dyes in each of the wavelength ranges of about 420 to about 460 nm, about 530 to about 570 nm and about 640 to about 680 nm is 0.01 to 0.15.

10. The photographic polyester film support of claim 1, wherein the polyester is polyethylene terephthalate.

* * * * *